Dec. 29, 1959  E. V. SUNDT  2,919,407
PROTECTING SYSTEM FOR METERS OR THE LIKE
Filed Feb. 14, 1955
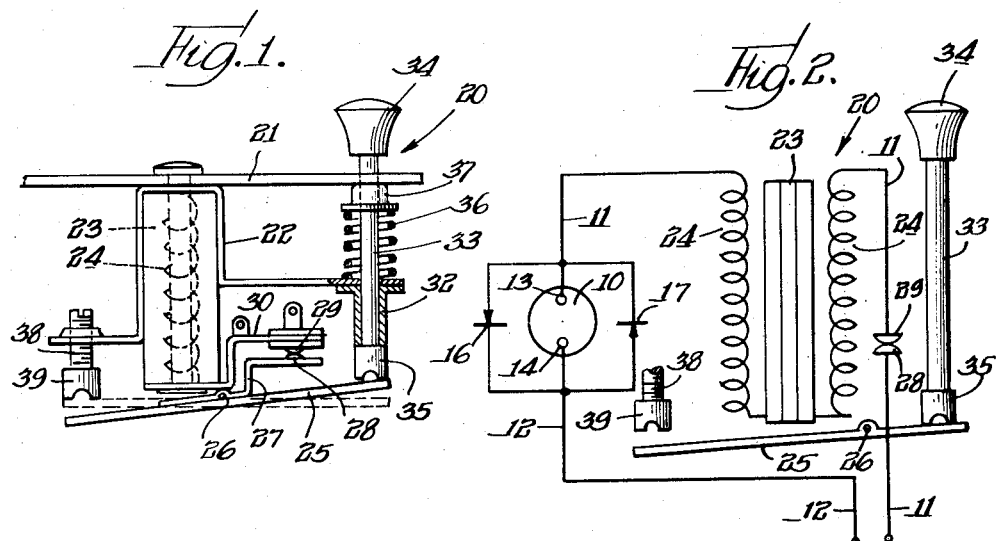
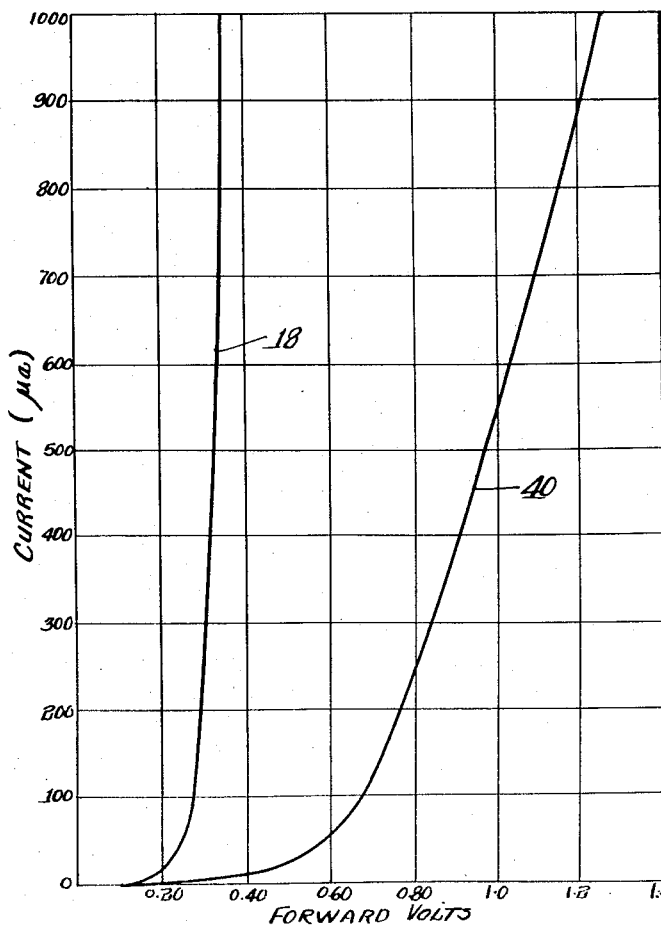
INVENTOR.
Edward V. Sundt
BY
Wallenstein & Spangenberg
Attys United States Patent Office 2,919,407
Patented Dec. 29, 1959

2,919,407

PROTECTING SYSTEM FOR METERS OR THE LIKE

Edward V. Sundt, Wilmette, Ill.

Application February 14, 1955, Serial No. 487,867

3 Claims. (Cl. 324—110)

This invention relates to a system for protecting a low current meter or the like against overload conditions in the circuit including the meter.

In the past, low range fuses and delicate circuit breakers have been utilized for this purpose, but they have not proven to be entirely successful. Fuses in low ranges of approximately one-hundredth to one-thousandth ampere ratings have resistance values from about one hundred ohms to three thousand ohms. In many low power circuits using delicate low current and voltage meters and the like, the voltage drop caused by the passage of normal current through the series connected fuse introduces errors in the meter readings which cannot be tolerated. Although it is possible to calibrate the meter including the series fuse under normal current conditions, the meter calibration may become unreliable after blown fuse replacement, because the resistance of the replacement fuse may vary as much as plus or minus fifteen percent.

Delicate magnetic circuit breakers and protective relays also are at a great disadvantage when protecting meter circuits of about one milliampere. At such low currents the coil and contact action thereof must be very delicate and as such is not adapted to commercial service. Also, in order to be effective, the coil must operate on extremely low currents requiring a large number of turns in the coil. As a result the resistance is built up in series with the meter or the like to such an extent that too much of the circuit energy is absorbed by the protective device.

The principal object of this invention is to provide an improved system for protecting meters or the like against overloads in the circuit, wherein the foregoing problems brought about by the use of fuses and delicate magnetic circuit breakers and protective fuses are overcome, wherein substantially all of the normal current flow in the circuit passes in substantially unimpeded fashion through the meter, wherein substantially all of the excessive current flow in the circuit is bypassed around the meter to prevent damage thereto, wherein the excessive current flow in the circuit is promptly interrupted further to prevent damage to the meter, wherein manual reclosing of the circuit may be required after interruptions thereof, and wherein rugged control components capable of withstanding the rigors of commercial usage are utilized.

Further objects of this invention reside in the details of construction of the protecting system and in the cooperative relationships between the component parts thereof.

Other objects and advantages of this invention will become apparent to those skilled in the art upon reference to the accompanying specification, claims and drawing, in which:

Fig. 1 is an elevational view of a circuit breaker which may be utilized in the protecting system of this invention;

Fig. 2 is a wiring diagram illustrating the protecting system of this invention; and Fig. 3 is a graph illustrating the forward voltage resistance characteristics of two kinds of rectifiers which may be utilized in the protecting system of this invention.

Referring first to Fig. 2, a low current meter or the like which is to be protected by the system of this invention is designated at 10 and it is shown to be included in a circuit 11, 12, it being connected into the circuit by suitable terminals 13 and 14. The meter or the like may be of any desired type or construction and for purposes of specific illustration herein it may be a milliameter of the galvanometer type wherein the order of the voltage drop across the meter is seldom above one-tenth volt. In such a meter an overload of 500% of full scale value is usually permissable without damage to the meter.

If the meter is to be protected against overload conditions in the circuit 11, 12 in both directions, a pair of current controlling means, such as rectifiers 16 and 17, are connected in shunt with the meter 10, but in opposite directions, and if protection is needed in one direction only, then a single rectifier may be utilized, this single rectifier, of course, being connected in the proper direction. The rectifiers 16 and 17 have high negative voltage characteristics and the rectifier 16 operates to protect against an overload condition in the circuit extending from 11 to 12 while the rectifier 17 operates to protect against an overload condition in the circuit extending from 12 to 11.

For the particular meter or the like selected herein by way of illustration the rectifiers 16 and 17 may be International Rectifier Corp. type GO—2 Germanium Diode rectifiers. The forward voltage characteristics of such a rectifier is designated by the curve 18 in the graph of Fig. 3 wherein the abscissa is in forward volts and the ordinate is in microampere current. Since the voltage drop across the meter is normally about one-tenth volt, that voltage appears across the rectifiers 16 and 17 during the normal operation of the circuit 11, 12 including the meter 10. At this voltage value of 0.10 volt the forward resistance of the rectifiers is extremely high and substantially no current is passed thereby, substantially all of the current flow in the circuit being directed through the meter 10. Thus the rectifiers have substantially no effect upon the normal operation of the meter within the range thereof. If, however, an overload should occur causing a voltage drop across the meter in the neighborhood of 0.40 or 0.50, which is within the permissable overload range of the meter, the forward resistance of the rectifiers becomes extremely low so as to pass large current flows as is clearly shown by the curve 18 in Fig. 3. Thus substantially all of the excess current flow upon the occurrence of an overload condition is bypassed by the rectifiers around the meter 10 to prevent damage to the meter. Thus the passage of excessive current through the meter, with resulting damage to the meter are effectively prevented.

The rectifiers 16 and 17 would quickly burn out, with resulting burning out of the meter, if no provision were made to open the circuit when their safecarrying capacities are exceeded. To prevent this the protecting system of this invention also includes a current interrupter, such as a circuit breaker, generally designated at 20, which is connected in the circuit in series with the shunt connected meter 10 and rectifiers 16 and 17. This circuit breaker 20 serves to open the circuit when it is sufficiently loaded by the bypassed excessive current, the circuit breaker thus co-operating with the rectifiers to form a second line of defense in protection in addition to the first line of defense in protection afforded by the rectifiers 16 and 17.

The circuit breaker 20, as shown more particularly in Figs. 1 and 2, may be of any desired construction and for purposes of illustration herein may include a panel 21 and a core 23. A coil 24 which may include a plurality of windings is associated with the core. An armature 25 is pivoted at 26 and co-operates with the core 23, the armature normally assuming the position shown in solid lines in Fig. 1 but being attracted to the position shown in dotted lines upon predetermined energization of the coil 24. The armature 25 carries an arm 27 which in turn carries a contact 28 engageable with a contact 29 carried by a stationary arm 30. The contacts 28 and 29 are normally engaged and are disengaged when the armature is tilted by the predetermined energization of the coil 24.

The circuit breaker 20 also includes a manual reset mechanism wherein a guide sleeve 32 is secured to the bracket 22 which slidably receives a rod 33. The outer end of the rod 33 is provided with a knob 34 for manipulating the same. The inner end of the rod 33 is provided with a permanent magnet 35 which magnetically maintains the armature 25 in the solid line position illustrated in Fig. 1. A spring 36 is interposed between the bracket 22 and a collar 37 carried by the rod 33 for normally maintaining the rod 33 and the permanent magnet 35 in the upper position as illustrated in Fig. 1. The bracket 22 adjustably carries a stud 38 which in turn carries a permanent magnet 39 adjacent the other end of the armature 25.

When the coil 24 is energized to a predetermined value, upon the occurrence of an overload condition in the circuit, the armature 25 is attracted by the core 23 against the magnetic action of the magnet 35 to turn the armature 25 to the position illustrated in dotted lines in Fig. 1 and to separate the contacts 38 and 39. When this occurs, the other magnet 39 holds the armature 25 in the dotted line position where it will remain until it is manually reset. To reclose the contacts 38 and 29 the knob 34 is pushed inwardly against the action of the spring 36 to cause the permanent magnet 35 to engage the armature 25. The permanent magnet 35 is stronger than the permanent magnet 39 so that when the knob 34 is released, the permanent magnet 35 pulls the armature 25 from the dotted line position to the solid line position as illustrated in Fig. 1, thereby closing the contacts 28 and 29. As shown in Fig. 2 the contacts 28 and 29 and the coil 24 are located in the circuit in series with the shunt connected meter 10 and rectifiers 16 and 17, so as to be operated by and to control the current flow in the circuit.

Because the coil 24 of the circuit breaker is operated by excessive current flow which is bypassed around the meter 10 by the rectifiers 16 and 17, the coil 24 may be a relatively high current coil of rugged and inexpensive construction so that it and the parts operated thereby may be capable of withstanding the rigors of commercial usage. This high current coil 24 may be so low in resistance that it has substantially no effect upon the current flow through the meter, the current flow through the meter being substantially unimpeded, and therefore the meter calibration is in no way substantially effected by the coil 24. The circuit breaker, as illustrated, may be made to remain open until manually reset, thus obviating the danger of recycling which may cause damage to the meter. For low overloads of 100% to 200% or so the rectifiers 16 and 17 alone serve to protect the meter, the circuit breaker 20 operating to protect the meter against high overloads in the neighborhood of 400% or 500% or more.

In operation, normal current flows through the contacts 28, 29, the coil 24 and the meter 10 and substantially no current flows through the rectifiers 16 and 17 due to the high forward resistance at the low voltages involved in normal operation. Under normal conditions the circuit breaker 20 has no substantial effect upon the meter. Upon the occurrence, however, of a high overload condition, the rectifiers 16 and 17 bypass the excessive current around the meter 10 and the excessive current operates to open the circuit breaker 20 to interrupt the circuit.

For meters or the like having different characteristics than those described above other types of rectifiers 16 and 17 may be used. For example, a type 1T1 selenium diode rectifier may be used, the forward resistance characteristics of which are illustrated by the curve 40 in Fig. 3. Such a rectifier would be used in conjunction with a meter having a larger normal voltage drop thereacross.

While for purposes of illustration one principal form of this invention has been disclosed, other forms thereof may become apparent to those skilled in the art upon reference to this disclosure and therefore this invention is to be limited only by the scope of the appended claims.

I claim as my invention:

1. A system for protecting a low current, highly sensitive meter or the like against overload conditions in the circuit including the meter comprising: current controlling means connected in shunt with the meter for directing through the meter substantially all normal current flow in the circuit up to a first value which the meter can handle and for bypassing around the meter current flow in the circuit in excess of said first value, said current controlling means being designed to handle current which will flow therein when the current in the circuit is within a range from said first value up to a second value above which said current controlling means will become damaged, and a circuit breaker including contacts and a low resistance coil which does not adversely affect the meter calibration over the current range of said meter when connected in series therewith, said contacts and said low resistance coil being connected in series with one another and with said meter and said current controlling means, said contacts being closed during normal current flow in the circuit, and said circuit breaker including means responsive to the flux developed in said coil by current of a value substantially in excess of said first value and within said range of values by opening said contacts.

2. The meter circuit of claim 1 wherein said circuit breaker includes means for maintaining the contacts thereof separated when they are separated by energization of the coil thereof, and means for manually reclosing the contacts thereof.

3. A system for protecting a low current, highly sensitive meter or the like against overload conditions in the circuit including the meter comprising: a rectifier connected in shunt with the meter and having a high forward resistance at voltages appearing across the meter for current flow in the circuit up to a first value which the meter is designed to handle for directing substantially all normal current flow through the meter, and a low forward resistance at voltages appearing across the meter for current flow in the circuit in excess of said first value for bypassing above normal current flow in the circuit around the meter, said rectifier being designed to handle current which will flow therein when the current in the circuit is within a range from said first value up to a second value above which the rectifier will be damaged, and a circuit breaker including contacts and a low resistance coil which does not adversely affect the meter calibration over the current range of said meter when connected in series therewith, said contacts and said low resistance coil being connected in series with one another and with said meter and said rectifier, said contacts being closed during normal current flow in the circuit, and said circuit breaker including means responsive to the flux developed in said coil by current of a value substantially in excess of said first value and within said range of values by opening said contacts.

References Cited in the file of this patent
UNITED STATES PATENTS

| | | |
|---|---|---|
| 1,960,068 | Ruppel | May 22, 1934 |
| 2,542,945 | Rojas et al. | Feb. 20, 1951 |
| 2,584,800 | Grisdale | Feb. 5, 1952 |
| 2,671,874 | Friedrichs | Mar. 9, 1954 |